(12) United States Patent
Akiba (10) Patent No.: US 11,006,381 B2
(45) Date of Patent: May 11, 2021

(54) COMMUNICATION APPARATUS AND METHOD OF CONTROLLING THE SAME

(71) Applicant: CANON KABUSHIKI KAISHA, Tokyo (JP)

(72) Inventor: Tomohiro Akiba, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 70 days.

(21) Appl. No.: 16/386,811

(22) Filed: Apr. 17, 2019

(65) Prior Publication Data
US 2019/0327701 A1 Oct. 24, 2019

(30) Foreign Application Priority Data

Apr. 23, 2018 (JP) .............................. JP2018-082461

(51) Int. Cl.
| | |
|---|---|
| *H04W 60/04* | (2009.01) |
| *H04W 76/18* | (2018.01) |
| *H04W 76/30* | (2018.01) |
| *H04W 12/06* | (2021.01) |

(52) U.S. Cl.
CPC .......... *H04W 60/04* (2013.01); *H04W 12/06* (2013.01); *H04W 76/18* (2018.02); *H04W 76/30* (2018.02)

(58) Field of Classification Search
CPC combination set(s) only.
See application file for complete search history.

(56) References Cited

U.S. PATENT DOCUMENTS

| | | | | |
|---|---|---|---|---|
| 2012/0094627 | A1* | 4/2012 | Suh | H04W 60/04 455/404.1 |
| 2014/0273820 | A1* | 9/2014 | Narayan | H04L 69/40 455/41.1 |

(Continued)

FOREIGN PATENT DOCUMENTS

| | | |
|---|---|---|
| JP | 2011103542 A | 5/2011 |
| JP | 2014225857 A | 12/2014 |

OTHER PUBLICATIONS

3GPP, "3rd Generation Partnership Project; Technical Specification Group Core Network and Terminals; Non-Access-Stratum (NAS) protocol for Evolved Packet System (EPS); Stage 3 (Release 15)," 3 GPP Standard; Technical Specification; 3rd Generation Partnership Project, Mobil Competence Ctr., France, Mar. 29, 2018, vol. CT WG1, No. V15.2.0, pp. 1-514.

(Continued)

*Primary Examiner* — Xavier S Wong
(74) *Attorney, Agent, or Firm* — Carter, DeLuca & Farrell LLP (57) ABSTRACT

A communication apparatus comprises a registration unit that registers an external communication apparatus in response to a registration request from the external communication apparatus, an authentication unit that performs an authentication process for the external communication apparatus registered by the registration unit, and a transition unit that transit the communication apparatus into a registration release mode in a case that the authentication process of the authentication unit has not succeeded, wherein the registration release mode is a mode for receiving a registration release request from the external communication apparatus.

12 Claims, 6 Drawing Sheets

(56) References Cited

U.S. PATENT DOCUMENTS

| | | | |
|---|---|---|---|
| 2015/0031378 A1* | 1/2015 | Rost | H04W 76/25 |
| | | | 455/450 |
| 2015/0199155 A1* | 7/2015 | Cho | G06F 3/1222 |
| | | | 358/1.14 |
| 2018/0209183 A1* | 7/2018 | Ham | H04W 12/0401 |
| 2018/0263066 A1* | 9/2018 | Chiang | H04L 65/1069 |
| 2019/0174449 A1* | 6/2019 | Shan | H04W 60/04 |

OTHER PUBLICATIONS

Extended European Search Report issued by the European Patent Office dated Jul. 8, 2019 in corresponding European Patent Application No. 19164826.0.

* cited by examiner

AUTHENTICATION OF ENCRYPTED COMMUNICATION HAS FAILED. THE SLAVE DEVICE IS STILL REGISTERED AND COMMUNICATION IS NOT ENCRYPTED. SHOULD REGISTRATION OF SLAVE DEVICE BE RELEASED TEMPORARILY IN ORDER TO PERFORM ENCRYPTED COMMUNICATION?

RELEASE REGISTRATION 311

MAINTAIN USAGE 312

FIG. 3B 320

REGISTRATION WAS INTERRUPTED BUT SLAVE DEVICE IS STILL REGISTERED. REGISTRATION OF THE SLAVE DEVICE WILL BE RELEASED.

FIG. 4

COMMUNICATION APPARATUS AND METHOD OF CONTROLLING THE SAME

BACKGROUND OF THE INVENTION

Field of the Invention

The present invention relates to a communication apparatus that can perform wireless communication and a method of controlling the same.

Description of the Related Art

There are various standards for wireless communications that use radio waves. Examples of such standards include so-called wireless LAN or Wi-Fi defined by IEEE802.11a/b/g/n and the like, and Bluetooth widely used for a headphone, a keyboard and the like. Further, there are other standards such as Zigbee and Z-Wave, which characteristically differ from one another in frequency, reach distance, power consumption, transfer rate, price and the like. Japanese Patent Laid-Open No. 2014-225857 discloses a wireless communication system in which communication between devices are performed by wireless communication such as IEEE802.11, Zigbee and Z-Wave.

From the viewpoint of security and the like, in some of the above-mentioned communication standards, such as Z-Wave, when registering a slave device to a controller device, a registration to a new controller device is not allowed unless the registered state in the controller device in which the slave device has been registered is released.

When a registration process is performed between a controller device and a slave device, first, a registration process is performed by non-encrypted communication and an ID is allocated from the controller device to the slave device. Subsequently, authentication is performed between the controller device and the slave device by, for example, a key exchange and a PIN code, and thus a safe communication channel is ensured. However, when the authentication such as a key exchange has failed, and/or when an interruption is made by the user, a safe communication channel is not ensured. Further, even when the authentication has not succeeded as described, the registration of the slave device remains, and non-encrypted communication can still be performed between the controller device and the slave device. In addition, to release the registered state between the controller device and the slave device, the user has to perform a predetermined operation on both the controller device and the slave device, and thus the operation in the case where authentication has not succeeded is complicated.

SUMMARY OF THE INVENTION

The present invention provides a technique for improving the convenience in the case where authentication in a registration of a slave device to a controller device has failed.

According to one aspect of the present invention, there is provided a communication apparatus comprising: a registration unit configured to register an external communication apparatus in response to a registration request from the external communication apparatus; an authentication unit configured to perform an authentication process for the external communication apparatus registered by the registration unit; and a transition unit configured to transit the communication apparatus into a registration release mode in a case that the authentication process of the authentication unit has not succeeded, the registration release mode being a mode for receiving a registration release request from the external communication apparatus.

According to another aspect of the present invention, there is provided a method of controlling a communication apparatus, comprising: registering an external communication apparatus in response to a registration request from the external communication apparatus; performing an authentication process for the external communication apparatus that is registered; and transiting the communication apparatus into a registration release mode in a case where the authentication process has not succeeded, the registration release mode being a mode for receiving a registration release request from the external communication apparatus.

According to another aspect of the present invention, there is provided a non-transitory computer-readable storage medium storing a program configured to cause a computer to execute a method of controlling a communication apparatus, the method comprising: registering an external communication apparatus in response to a registration request from the external communication apparatus; performing an authentication process for the external communication apparatus that is registered; and transiting the communication apparatus into a registration release mode in a case where the authentication process has not succeeded, the registration release mode being a mode for receiving a registration release request from the external communication apparatus.

Further features of the present invention will become apparent from the following description of exemplary embodiments with reference to the attached drawings.

DESCRIPTION OF THE EMBODIMENTS

Embodiments of the present invention are described with reference to the accompanying drawings.

First Embodiment

Figure 1A:
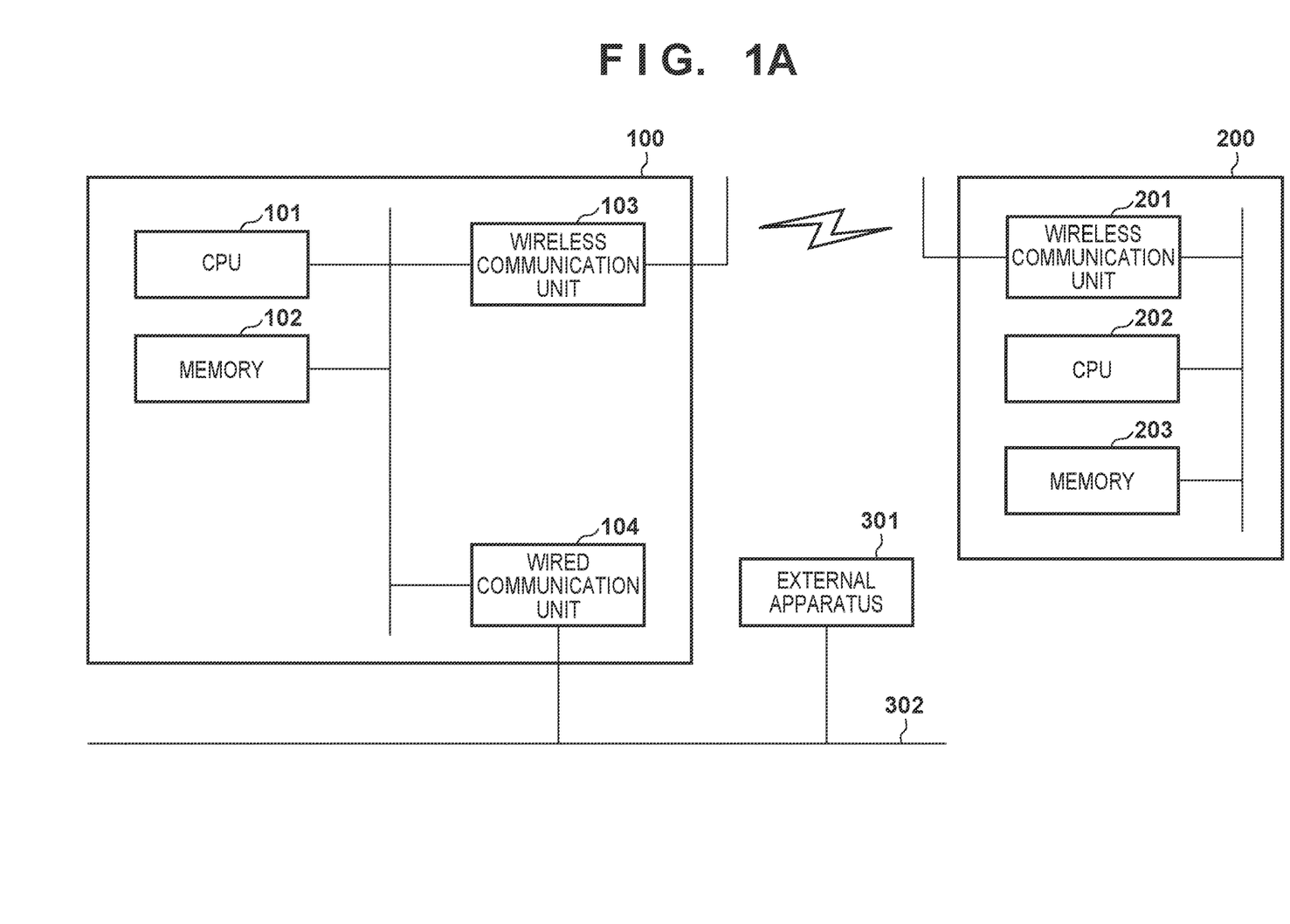
FIG. 1A is a block diagram illustrating an exemplary configuration of a communication system of a first embodiment.

FIG. 1A is a block diagram illustrating an exemplary configuration of a communication system of a first embodiment. The communication system of the first embodiment includes a communication controller device 100 and a communication slave device 200 that can be connected with each other through wireless communication, and an external apparatus 301 connected with the communication controller device 100 via a network 302.

The communication controller device 100 includes a CPU 101, a memory 102, a wireless communication unit 103 and a wired communication unit 104. The CPU 101 includes one or more processors, and performs a control of the entirety of the communication controller device 100, a control of the wireless communication unit 103 and the wired communication unit 104, the processes of a flowchart described later and the like by executing a predetermined program stored in the memory 102. The memory 102 is composed of one or more memories such as a ROM, a RAM and a hard disk, for example. The wireless communication unit 103 controls wireless communication based on Z-wave standard with the communication slave device 200, which is an external communication device for the communication controller device 100. The wired communication unit 104 controls communication via the network 302 with the external apparatus 301. The network 302 is, for example, a wired LAN such as Ethernet, and may be any other wired or wireless networks. Note that the communication controller device 100 is, for example, a network camera, and may include other hardware configurations such as an image-capturing unit that is not illustrated in FIG. 1A.

The communication slave device 200 includes a wireless communication unit 201, a CPU 202 and a memory 203. The wireless communication unit 201 controls wireless communication based on Z-wave standard with the communication controller device 100, which is an external communication device for the communication slave device 200. The CPU 202 includes one or more processors, and achieves various controls of the communication slave device 200 by executing a program stored in the memory 203. The memory 102 is composed of one or more memories such as a ROM, a RAM and a hard disk, for example. Note that the communication slave device is, for example, a sensor device such as a temperature sensor, an illumination sensor and a human sensor, and may include a hardware configuration for executing a required function in accordance with the sensor type.

The external apparatus 301 is used to operate the communication controller device 100 by the user of the communication controller device 100 and/or to display information from the communication controller device 100. The external apparatus 301 includes an operation unit (not illustrated in the drawing) for receiving a user's operation and a display unit (not illustrated in the drawing) for displaying information to the user. The network 302 is a communication medium between the communication controller device 100 and the external apparatus 301. Note that the external apparatus 301, the network 302 and the wired communication unit 104 are used for an operation input to the communication controller device 100 by the user, and for notification of information to the user from the communication controller device 100, and as such the external apparatus 301, the network 302 and the wired communication unit 104 are not essential components as a system. In addition, as an alternative configuration, the communication controller device 100 may be provided with the functions of the operation unit and the display unit. Note that the external apparatus 301 is, for example, a PC. Via the network 302, the external apparatus 301 can acquire an image and/or a video captured with a network camera serving as the communication controller device 100, and can display the image and/or the video. Further, information for controlling the network camera can be transmitted to the communication controller device 100 via the network 302 to remote control the image-capturing of the network camera. Alternatively, the external apparatus 301 may be a mobile terminal such as a smartphone, and in this case, it is desirable that the network 302 be a wireless network such as a wireless LAN, or a public wireless network such as 3G and LTE.

Since the communication controller device 100 and the communication slave device 200 use radio waves, it is necessary to perform a registration process between these communication devices in order to establish communication between the communication devices. Further, in some situation, it is necessary to perform an information exchanging process (pairing) for performing data encryption as necessary. Note that, in the present embodiment, the communication devices are appropriately referred to as a controller device or a slave device so as to distinguish the devices in accordance with their roles. The registration process has two main roles. One main role is to determine the connection between the devices, and with this role, devices that are not physically connected can identify each other and communicate with each other. The other role is to authenticate connected devices to establish safe communication only between the connected devices, and with this role, interception and/or spoofing by third parties can be prevented.

In Wi-Fi, the controller device holds a unique ID (SSID) and a password, and the SSID and the password are used when connecting the slave device to the controller device. Communication between the controller device and the slave device is enabled only when the authentication using the password has succeeded. With such a feature of the authentication method, typically, a controller device does not manage slave devices and receives communication from unspecified number of slave devices, and as such leakage of the password may cause serious harm. Further, when registering a slave device to a new controller device, it is only necessary to use the SSID and the password of the new controller device. In Bluetooth, a given operation (typically, a long-press of a button or the like) is performed in the controller device and the slave device at almost the same time to exchange encryption keys during the operation, and thus encrypted communication of data is enabled. In addition, in some cases, a confirmation operation and/or input of numbers (PIN code) is additionally performed by the user to verify the validity of the encryption key. Since both the controller device and the slave device are required to be operated, a particular slave device can be selectively registered, and a slave device can be registered to a new controller device simply by performing a similar operation with the new controller device.

In Z-wave standard, for security purposes and the like, a registration to a new controller device is not allowed unless the registered state between the controller device and the slave device is released. While Z-wave standard, on which the above-mentioned restriction is imposed, is assumed for the communication between the communication controller device 100 and the communication slave device 200 in the present embodiment, the present embodiment is applicable not only to Z-wave, but also to any communication standard on which the above-mentioned restriction is imposed.

Figure 1B:
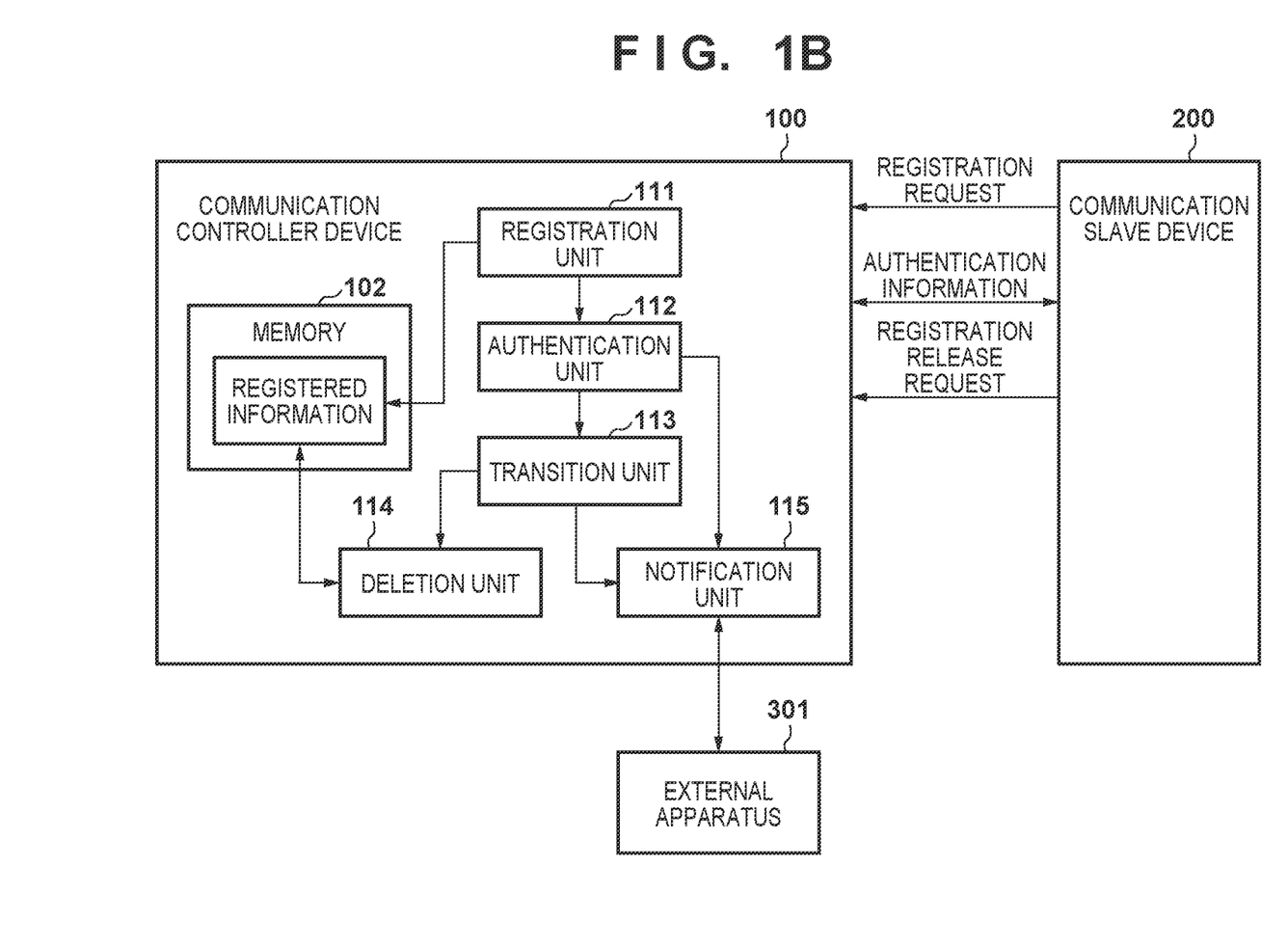
FIG. 1B is a block diagram illustrating an exemplary functional configuration of a communication controller device 100.

FIG. 1B is a block diagram illustrating an exemplary functional configuration of a communication controller device 100. The functional parts illustrated in FIG. 1B may be achieved with the CPU 101 by executing a program stored in the memory 102, or by dedicated hardware, or, by software and hardware in conjunction with each other.

A registration unit 111 registers the communication slave device 200 in response to a registration request from the communication slave device 200, which is an external communication device. The registration information includes at least identification information (ID) for uniquely identifying the device in communication based on Z-wave, and is stored in the memory 102, for example. An authentication unit 112 performs an authentication process using authentication information (key exchange, a PIN code and the like) for the communication slave device 200 registered by the registration unit 111. A transition unit 113 transits the communication controller device 100 (the wireless communication unit 103) into a registration release mode for receiving a registration release request from the communication slave device 200 when the authentication process of the authentication unit 112 has not succeeded. In response to a reception of a registration release request from the communication slave device 200 in the registration release mode, a deletion unit 114 deletes the registration of the communication slave device 200 by the registration unit 111. A notification unit 115 notifies a failure of authentication to the external apparatus 301 when the authentication has failed. Note that the notification unit 115 may notify content of the notification (failure of authentication) to the user instead of, or in addition to, the notification to the external apparatus. Also, the notification unit 115 receives an instruction of the user from the external apparatus 301.

The transition unit 113 transits the wireless communication unit 103 into the registration release mode in response to an instruction of the user according to the notification unit 115 in the present embodiment although the transition unit 113 may transit the wireless communication unit 103 into the registration release mode in response to a failure of authentication. For example, when a registration release instruction is made by the user in response to a notification of an authentication failure from the notification unit 115, the transition unit 113 transits the wireless communication unit 103 into the registration release mode. With this configuration, the user can select whether to release or to maintain the registered state of the communication slave device 200.

Figure 2:
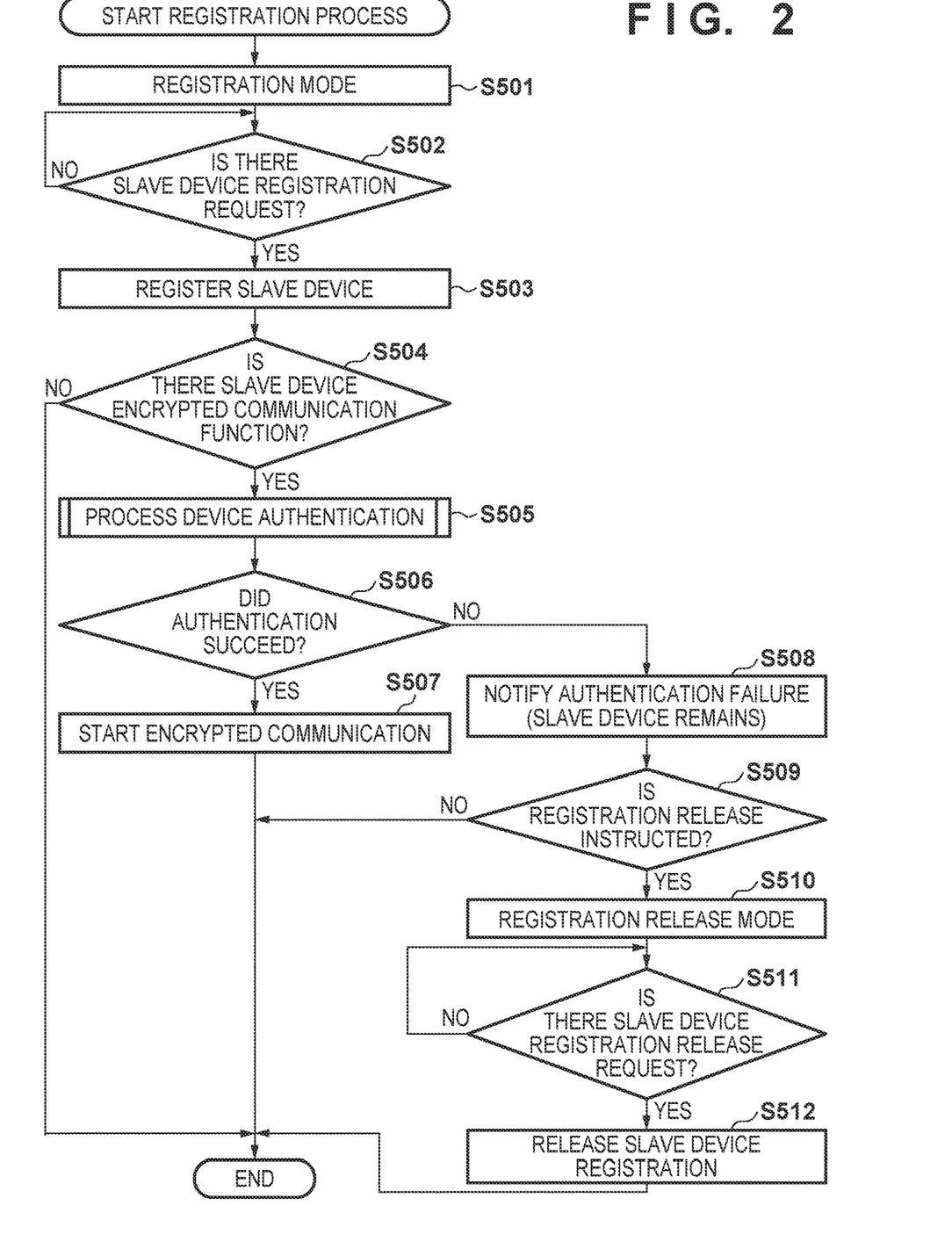
FIG. 2 is a flowchart of a process of registering a communication slave device in the communication controller device of the first embodiment.
Figure 3A:
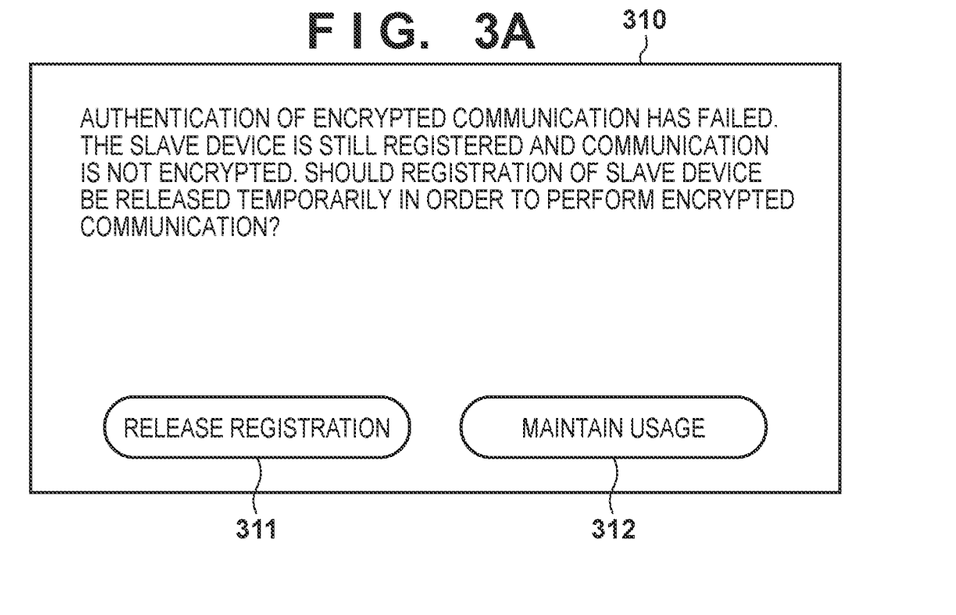
FIG. 3A illustrates an exemplary notification screen for a case where authentication has failed.
Figure 5:
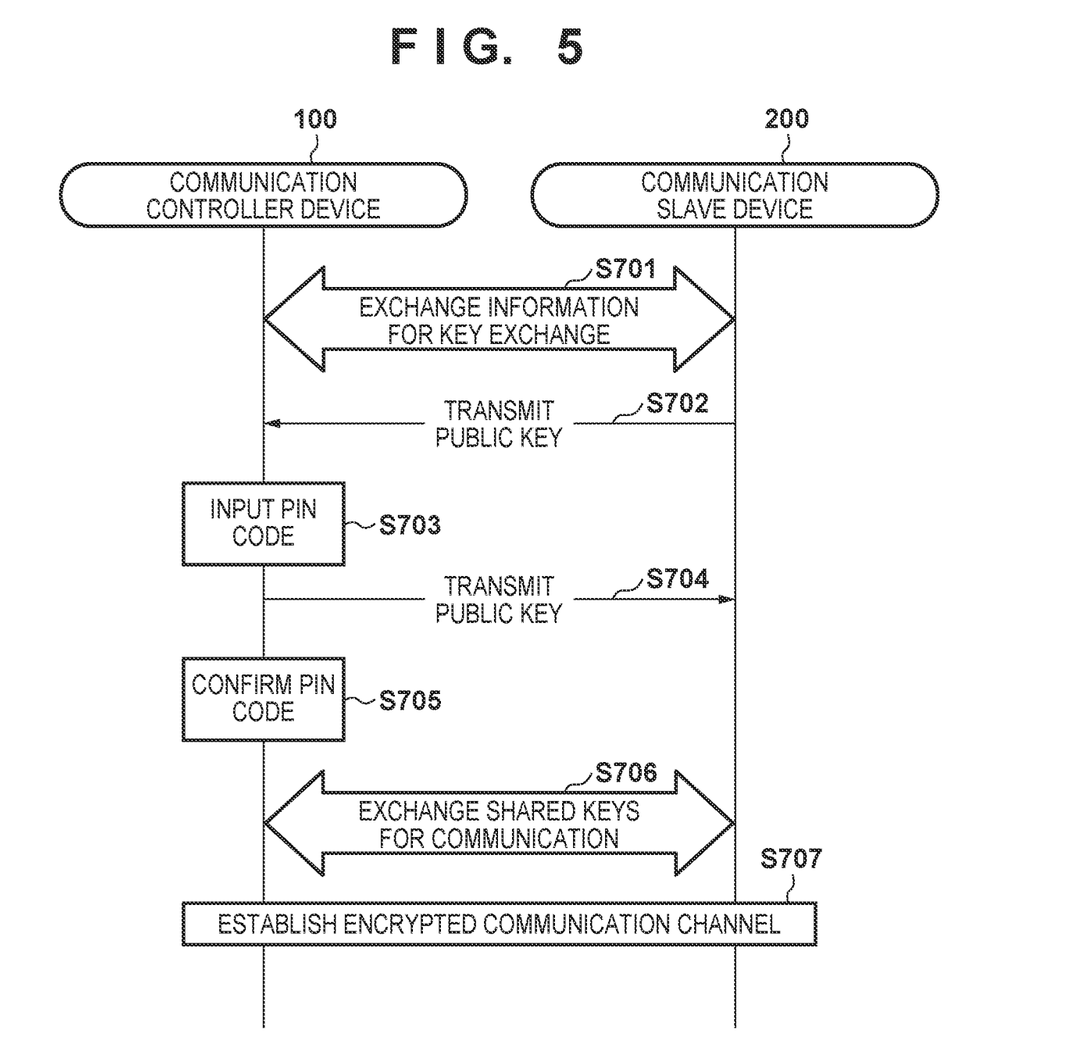
FIG. 5 illustrates a sequence of an authentication process.

Next, with reference to a flowchart of FIG. 2, an exemplary screen display of FIG. 3A, and a device authentication sequence diagram of FIG. 5, a registration process of the communication controller device 100 of the first embodiment is described. In a registration process of the present embodiment, when a safe communication channel cannot be ensured between the communication controller device 100 and the communication slave device 200, the registered state of the communication slave device 200 in the communication controller device 100 is promptly released. As a result, the re-registration process of the communication slave device 200 can be promptly performed.

FIG. 2 is a flowchart of an operation of the communication controller device 100 of the first embodiment. First, upon receiving a registration start instruction for the communication slave device 200 made by the user in the external apparatus 301, the registration unit 111 transits the wireless communication unit 103 into a registration mode (S501). Next, the registration unit 111 waits for a registration request transmitted from the communication slave device 200 via the wireless communication unit 201 (S502). The transmission of a registration request from the communication slave device 200 is made by the user operating the communication slave device 200.

Upon receiving a registration request from the communication slave device 200 (YES at S502), the registration unit 111 registers the communication slave device 200 as a slave device by exchanging information about the performance, property and the like of the devices between the communication controller device 100 and the communication slave device 200 (S503). The performance information of the devices exchanged here includes information representing whether the devices have an encrypted communication function. When both the communication controller device 100 and the communication slave device 200 have an encrypted communication function (YES at S504), the authentication unit 112 performs a device authentication process between the communication controller device 100 and the communication slave device 200 (S505). The device authentication process includes a process of inputting and confirming an authentication password (PIN code) for determining the validity of the device, and a process of exchanging an encryption key of data used in encrypted communication. Details of the device authentication process is described later with reference to FIG. 5. When the device authentication has succeeded (YES at S506), encrypted communication is enabled, and the communication controller device 100 and the communication slave device 200 start encrypted communication (S507), and, the registration process is terminated.

When the device authentication has failed (NO at S506), such as when an invalid PIN code is input and when the authentication has not been completed due to degradation of the communication quality and the like, the notification unit 115 notifies the external apparatus 301 that the authentication has failed and that the communication slave device 200 remains (S508). Upon receiving this notification, the external apparatus 301 displays a screen 310 illustrated in FIG. 3A. The screen 310 notifies that the authentication has failed and that the communication slave device where the authentication has failed is in the registered state, while displaying a release button 311 and a maintain button 312. With the release button 311 and the maintain button 312, the user can select whether to release or to maintain the registered state.

When the user instructs maintenance of the registration at the external apparatus 301, or more specifically, when information representing a press of the maintain button 312 is received (NO at S509), this process is terminated without change. As a result, the registered state of the communication slave device 200 is maintained. When the user instructs release of the registration at the external apparatus 301, or more specifically, when information representing a press of the release button 311 is received (YES at S509), the transition unit 113 transits the wireless communication unit 103 into the registration release mode (S510). In the registration release mode, the communication controller device 100 is allowed to receive a registration release request from the communication slave device 200.

The user operates the communication slave device 200 to transmit a registration release request via the wireless communication unit 201. Upon receiving a registration release request from the communication slave device 200 in the registration release mode (S511), the deletion unit 114 deletes the communication slave device 200 from the registration of the communication slave device 200 (S512), and terminates this processing.

FIG. 5 illustrates an exemplary device authentication process at S505. While it is assumed that a public key cryptography is used in the present embodiment, this is not limitative. Also, the location where the processes are executed and the order in which the processes are executed are not limited to those illustrated in the drawing.

First, information (a corresponding encryption algorithm and the like) used in the subsequent key exchanging process is exchanged between the communication controller device 100 and the communication slave device 200 (S701). By using the information exchanged at S701, the communication slave device 200 transmits a public key to the communication controller device 100 (S702). The user inputs a PIN code to the communication controller device 100 (S703). The authentication unit 112 of the communication controller device 100 transmits the public key to the communication slave device 200 (S704). The authentication unit 112 determines the validity of the input PIN code by use of the received public key (S705). Upon determining the PIN code to be invalid, the authentication fails. Upon confirming the PIN code to be valid, the communication controller device 100 and the communication slave device 200 exchange data encryption keys that are used in the subsequent communication (S706). Through the above-mentioned processes, an encrypted communication channel is ensured between the communication controller device 100 and the communication slave device 200 (S707).

As described above, according to the first embodiment, when a communication controller device fails in an authentication process with a communication slave device, the communication controller device transits into the operation registration deletion mode in an automatic manner or by a simple operation on a notification screen such as that illustrated in FIG. 3A. Thus, in the case where authentication has failed and the safe communication path cannot be ensured, can be easily handled. In addition, since a notification screen such as that illustrated in FIG. 3A is employed, the user can select whether to maintain the registered state, and thus the case where the authentication has failed can be handled with improved flexibility and operability.

Second Embodiment

In the first embodiment, a process of releasing the registered state of the communication slave device in response to a failure of authentication is described. The second embodiment describes a process of releasing the registered state of the communication slave device when an interruption is instructed during an authentication process. The second embodiment presents a process of the communication controller device 100 that can promptly perform a registration release of the communication slave device 200 when an interruption is instructed by the user while trying to ensure a safe communication channel between the communication controller device 100 and the communication slave device 200. Note that the configurations and the authentication process of the communication system, the communication controller device 100 and the communication slave device 200 are similar to those of the first embodiment (FIG. 1A, FIG. 1B and FIG. 5).

Figure 3B:
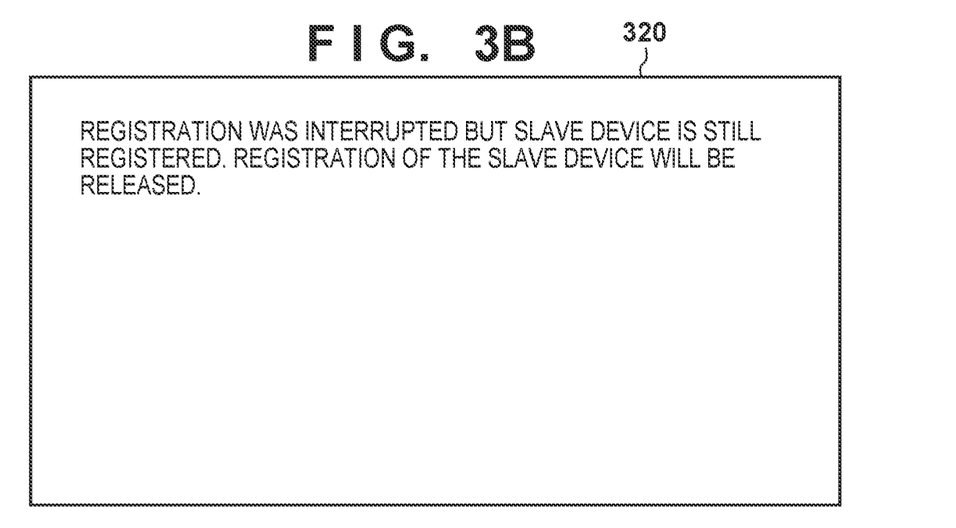
FIG. 3B illustrates an exemplary notification screen for a case where a registration has been interrupted.
Figure 4:
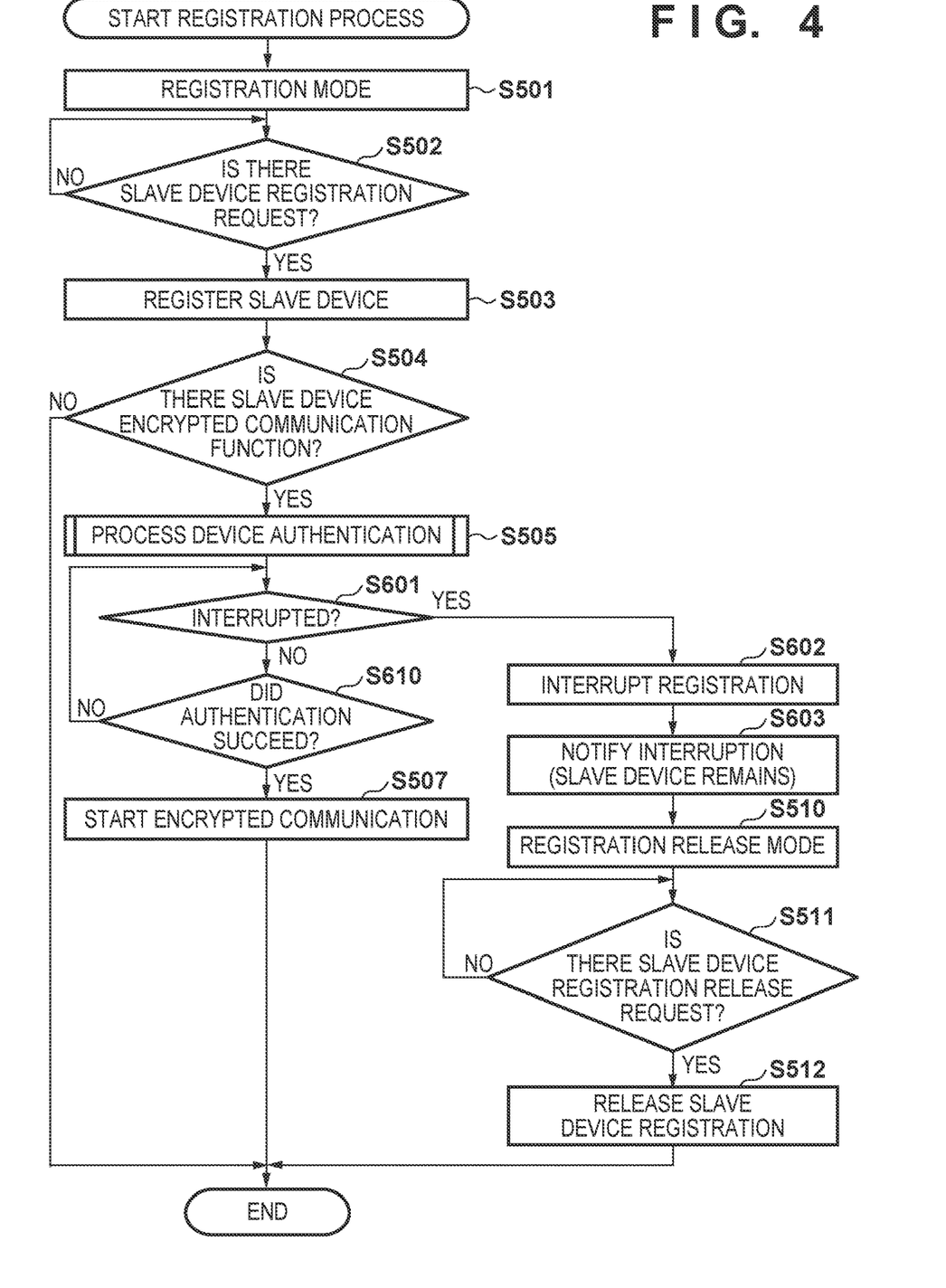
FIG. 4 is a flowchart of a process of registering a communication slave device in a communication controller device of a second embodiment.

FIG. 4 is a flowchart of a process of registering a communication slave device by a communication controller device of the second embodiment. FIG. 3B illustrates an exemplary notification screen in the case where the registration is interrupted. An operation of the communication controller device 100 according to the second embodiment is described below with reference to FIG. 3B and FIG. 4.

The processes to S505 (S501 to S505) for the device authentication process are similar to those of the first embodiment. Whether the user has instructed an interruption in the period from the start of the device authentication process to a success in authentication (NO at S610), is being confirmed (S601). When no interruption has been instructed (NO at S601) and the authentication has been succeeded (YES at S610), encrypted communication is enabled, and the communication controller device 100 and the communication slave device 200 start encrypted communication (S507), and, the registration process is terminated.

When an interruption is instructed before the success of the authentication is confirmed (YES at S601), the authentication unit 112 interrupts the device authentication process with the wireless communication unit 103 (S602). Upon the authentication unit 112 interrupting the authentication process, the notification unit 115 makes a notification about the interruption (S603). Upon receiving the notification, the external apparatus 301 displays a screen 320 illustrated in FIG. 3B. The screen 320 notifies that the registration process including the device authentication has been interrupted, that the communication slave device 200 is in the registered state, and that the registered state will be released. In this case, the intention of the user to interrupt the registration is clear, and therefore the registered state should be promptly released. For this reason, the release button 311 and the maintain button 312 for the user to select whether to release or to maintain the registration are not provided in the screen 320, unlike the screen 310.

The transition unit 113 transits the wireless communication unit 103 into the registration release mode without waiting for the user's operation (registration release instruction) (S510). Subsequently, S510 to S512 are similar to those of the first embodiment (FIG. 2). In the above-mentioned, when an instruction of interrupting the registration is received during execution of the authentication of the authentication process, the communication controller device 100 immediately transits the wireless communication unit 103 into the registration release mode. Note that only the release button 311 may be displayed such that the user confirms and instructs a release of the registered state. Further, as in the first embodiment, the release button 311 and the maintain button 312 may be displayed on the screen 320 such that the user selects whether to release or to maintain the registered state of the communication slave device 200.

As described above, according to the first and second embodiments, the registered state of the communication slave device can be promptly released in the case where a safe communication channel has not been ensured in a wireless communication standard in which a registration to a new controller device is not allowed unless the registered state between the communication controller device and the communication slave device is released. As a result, the re-registration of the communication slave device can be quickly performed, and thus the user convenience is improved.

While the process of releasing the registered state in response to a failure of authentication is described in the first embodiment and the process of releasing the registered state in response to an instruction of an interruption is described in the second embodiment, it is evident that these processes may be combined. In this case, either of the process of the first embodiment and the process of the second embodiment is executed may be selected in accordance with the cause of the failure of the authentication process. For example, the notification of FIG. 3A is provided in the case where a failure of the authentication process is the cause, and the notification of FIG. 3B is provided in the case where the cause is an instruction of an interruption. While a network camera, a sensor device and a PC are exemplified as the controller device, the slave device and the external apparatus, respectively, in the embodiments, the present embodiment is applicable to other devices.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc(BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-082461, filed Apr. 23, 2018, which is hereby incorporated by reference herein in its entirety.

What is claimed is:

1. A communication apparatus comprising:
   one or more processors; and
   one or more memories including instructions that, when executed by the one or more processors, cause the communication apparatus to function as:
   a registration unit configured to register an external communication apparatus in response to a registration request from the external communication apparatus;
   an authentication unit configured to perform an authentication process for the external communication apparatus registered by the registration unit;
   a selection unit configured to allow a user to select whether to maintain the registration of the external communication apparatus in a case that the authentication process by the authentication unit has not succeeded;
   an execution unit configured to execute non-encrypted communication with the external communication apparatus in a case that the authentication process by the authentication unit has not succeeded and the user has selected to maintain the registration of the external communication apparatus by the selection unit; and
   a transition unit configured to transit the communication apparatus into a registration release mode in a case that the authentication process of the authentication unit has not succeeded and the user has selected not to maintain the registration of the external communication apparatus by the selection unit,
   wherein the registration release mode is a mode for receiving a registration release request from the external communication apparatus.

2. The communication apparatus according to claim 1, wherein the instructions, when executed by the one or more processors, further cause the communication apparatus to function as a deletion unit configured to delete a registration of the external communication apparatus by the registration unit upon receiving the registration release request from the external communication apparatus in the registration release mode.

3. The communication apparatus according to claim 1, wherein:
   the case that the authentication process of the authentication unit has not succeeded includes a case that the authentication by the authentication process has failed; and
   the communication apparatus further comprises a notification unit configured to notify a failure of authentication in the case that the authentication by the authentication process has failed.

4. The communication apparatus according to claim 3, wherein the case that the authentication by the authentication process has failed includes a case that invalid authentication information is input, or a case where the authentication is not completed due to degradation of communication quality.

5. The communication apparatus according to claim 3, wherein the notification unit includes a display unit configured to display content of a notification.

6. The communication apparatus according to claim 3, wherein the notification unit transmits a notification to an external apparatus, the external apparatus being different from the external communication apparatus.

7. The communication apparatus according to claim 1, wherein:
   the case that the authentication process of the authentication unit has not succeeded includes a case that an instruction of interrupting a registration is received during the authentication process; and
   the communication apparatus further comprises a notification unit configured to notify an interruption of the registration in the case that the instruction of interrupting the registration is received during the authentication process.

8. The communication apparatus according to claim 7, wherein the transition unit transits the communication apparatus to the registration release mode without waiting for a user's operation in a case where the instruction of interrupting the registration is received during authentication by the authentication process.

9. The communication apparatus according to claim 1, wherein the authentication process is performed for encrypted communication between the communication apparatus and the external communication apparatus.

10. The communication apparatus according to claim 1, wherein the instructions, when executed by the one or more processors, further cause the communication apparatus to function as a communication unit configured to execute encrypted communication with the external communication apparatus without the user's selection by the selection unit in a case that the authentication process by the authentication unit has succeeded.

11. A method of controlling a communication apparatus, comprising:

registering an external communication apparatus in response to a registration request from the external communication apparatus;

performing an authentication process for the external communication apparatus that is registered;

allowing a user to select whether to maintain the registration of the external communication apparatus in a case that the authentication process has not succeeded;

executing non-encrypted communication with the external communication apparatus in a case that the authentication process has not succeeded and the user has selected to maintain the registration of the external communication apparatus; and transiting the communication apparatus into a registration release mode in a case where the authentication process has not succeeded and the user has selected not to maintain the registration of the external communication apparatus, wherein the registration release mode is a mode for receiving a registration release request from the external communication apparatus.

12. A non-transitory computer-readable storage medium storing a program configured to cause a computer to execute a method of controlling a communication apparatus, the method comprising:

registering an external communication apparatus in response to a registration request from the external communication apparatus;

performing an authentication process for the external communication apparatus that is registered;

allowing a user to select whether to maintain the registration of the external communication apparatus in a case that the authentication process has not succeeded;

executing non-encrypted communication with the external communication apparatus in a case that the authentication process has not succeeded and the user has selected to maintain the registration of the external communication apparatus; and transiting the communication apparatus into a registration release mode in a case where the authentication process has not succeeded and the user has selected not to maintain the registration of the external communication apparatus, wherein the registration release mode is a mode for receiving a registration release request from the external communication apparatus.

* * * * *